(12) United States Patent
Hellbusch

(10) Patent No.: US 7,926,833 B2
(45) Date of Patent: Apr. 19, 2011

(54) ALL-WHEELS STEER TRAILER

(76) Inventor: James A. Hellbusch, Columbus, NE (US)

( * ) Notice: Subject to any disclaimer, the term of this patent is extended or adjusted under 35 U.S.C. 154(b) by 21 days.

(21) Appl. No.: 12/587,090

(22) Filed: Oct. 1, 2009

(65) Prior Publication Data
US 2011/0062680 A1 Mar. 17, 2011

Related U.S. Application Data

(60) Provisional application No. 61/276,590, filed on Sep. 14, 2009.

(51) Int. Cl.
*B62D 13/00* (2006.01)
(52) U.S. Cl. ............... 280/442; 280/91.1; 180/24.01
(58) Field of Classification Search ............ 280/442, 280/100, 82, 85, 91.1, 408, 426, 419, 98; 180/24.01
See application file for complete search history.

(56) References Cited

U.S. PATENT DOCUMENTS

| | | | |
|---|---|---|---|
| 3,149,858 A * | 9/1964 | Roy | 280/442 |
| 3,529,848 A * | 9/1970 | Harvey | 280/99 |
| 3,620,549 A * | 11/1971 | Miller et al. | 280/99 |
| 3,853,330 A * | 12/1974 | Hanaoka | 280/99 |
| 5,090,719 A * | 2/1992 | Hanaoka | 280/408 |
| 5,477,937 A * | 12/1995 | Chagnon | 180/24.01 |
| 6,105,981 A * | 8/2000 | Buelt et al. | 280/86.751 |
| 6,619,680 B2 * | 9/2003 | Platteeuw et al. | 280/100 |
| 7,571,916 B2 * | 8/2009 | Skiles | 280/100 |
| 2005/0077703 A1* | 4/2005 | Tango | 280/442 |
| 2007/0090625 A1* | 4/2007 | Skiles | 280/442 |
| 2009/0020983 A1* | 1/2009 | Broemeling | 280/476.1 |

* cited by examiner

*Primary Examiner* — Joanne Silbermann
*Assistant Examiner* — Tashiana Adams
(74) *Attorney, Agent, or Firm* — Dennis L. Thomte; Thomte Patent Law Office LLC

(57) ABSTRACT

An all-wheel steer trailer is disclosed which includes front and rear axle beams which are pivotally mounted, above vertical axes, to the forward and rearward ends of a frame. In normal operation, the front and rear axle beams are interconnected so that the rear axle beam will pivot in an opposite direction to pivotal movement of the front axle beams so that the rear wheels of the trailer will track the front wheels of the trailer as the trailer is being turned. The trailer includes a convenient locking assembly which may be quickly utilized to prevent pivotal movement of the rear axle beam with respect to the frame when it is desired to pull the trailer on a highway or roadway.

8 Claims, 7 Drawing Sheets

ALL-WHEELS STEER TRAILER

CROSS-REFERENCE TO RELATED APPLICATION

This application claims the priority date of Sep. 14, 2009 relating to the provisional application Ser. No. 61/276,590.

BACKGROUND OF THE INVENTION

1. Field of the Invention

This invention relates to an all-wheel steer trailer and more particularly to an all-wheel steer trailer which is ideally suited for use in the agriculture industry to support fertilizer tanks or the like thereon. Even more particularly, the trailer of this invention includes a mechanism interconnecting the front and rear axle beams on the trailer so that the front and rear wheels will track one another. Even more particularly, this invention relates to a locking assembly which prevents the rear axle beam of the trailer from pivoting with respect to the main frame when the front axle beam is pivoted so that the trailer may be towed on a highway or the like without the rear wheels tracking the front wheels.

2. Description of the Related Art

Dual axle trailers have long been provided wherein the front axle beam and the rear axle beam are pivoted in opposite directions relative to a main frame when the front axle beam is pivoted in one direction or another so that the rear wheels track the front wheels. An all-wheel steer trailer is disclosed in U.S. Pat. No. 7,571,916. In most all-wheel steer or four-wheel steer trailers, the front and rear axle beams are interconnected by means of a diagonally extending tie rod to cause the simultaneously pivoting of the front and rear axle beams in opposite directions. A problem exists in the art in that when the trailer is to be towed on a road or highway, there is no convenient way of preventing the pivotal movement of the rear axle beam which makes it somewhat hazardous for the trailer to be moved along a road or highway.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An all-wheel steer trailer is disclosed which includes a substantially horizontally disposed frame having a forward and rearward end, a left side and a right side. The trailer includes a transversely extending front axle beam having wheels mounted at the opposite ends thereof. A forwardly extending hitch is secured to the front axle beam and extends forwardly therefrom for connection to a towing vehicle or another agricultural implement such as a tool bar or the like. The front axle beam is pivotally secured, about a vertical axis and a horizontal axis, to the frame at the forward end thereof. The trailer also includes a transversely extending rear axle beam, having first and second ends, which is pivotally secured about a vertical axis to the frame at the rearward end thereof. Wheels are rotatably secured to the opposite ends of the rear axle beam. A lower horizontally disposed plate is fixedly secured to the rear axle beam at the pivotal connection of the rear axle beam to the frame. An upper horizontally disposed plate is fixedly secured to the frame above the lower plate. An intermediate horizontally disposed plate is positioned between the lower and upper plates. The trailer also includes an elongated tie rod having forward and rearward ends with the forward end of the tie rod being pivotally secured, about a vertical axis, to the front axle beam inwardly of the first end thereof. The rearward end of the tie rod is pivotally secured about a vertical axis, to the intermediate plate. A vertically disposed king pin extends through the lower, intermediate and upper plates to pivotally secure the rear axle beam to the frame.

The trailer includes a locking assembly which is mounted on the rear axle beam and which is selectively movable between first and second positions. The locking assembly, when in its first position, interconnects the rear axle beam to the intermediate plate whereby pivotal movement of the front axle beam in a first direction with respect to the frame will cause the rear axle beam to pivotally move with respect to the frame in a direction opposite to the first direction. The locking assembly, when in its second position, is disengaged from its connection to the intermediate plate and is interconnected to the upper plate to prevent pivotal movement of the rear axle beam with respect to the frame when the front axle beam is pivoted with respect to the frame by the hitch.

In the preferred embodiment, the front and rear axle beams are length adjustable. Also, in the preferred embodiment, a safety mechanism is provided which prevents the locking assembly from moving from its second position.

It is therefore a principal object of the invention to provide an improved all-wheel steer trailer.

A further object of the invention is to provide a trailer of the type described wherein a locking means is provided for conveniently locking the rear axle beam of the trailer in a position where it cannot pivotally move with respect to the frame of the trailer.

A further object of the invention is to provide a trailer of the type described which is convenient to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
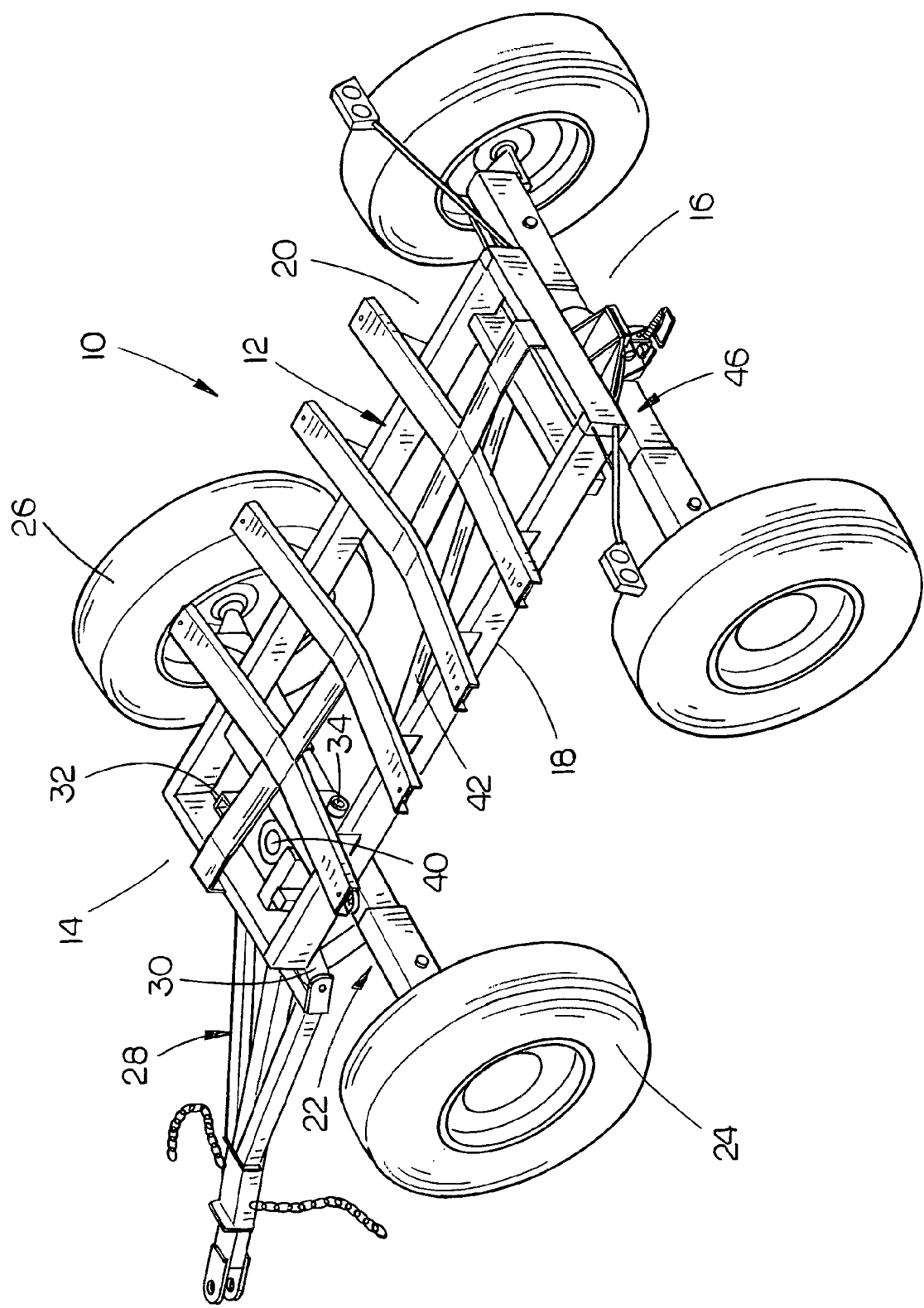
FIG. 1 is a rear perspective view of the trailer of this invention.
Figure 2:
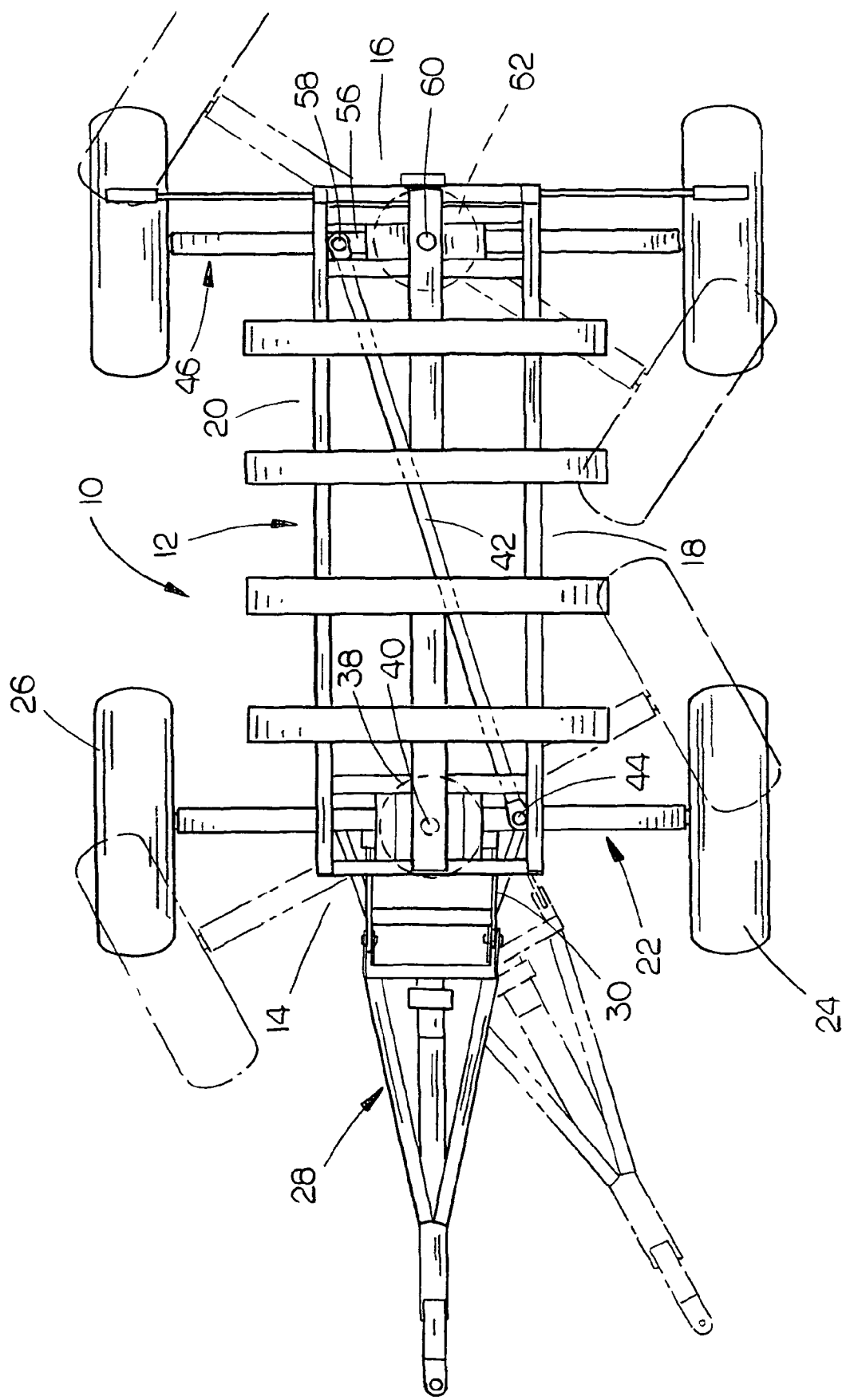
FIG. 2 is a top elevational view of the trailer of this invention, with the broken lines illustrating the mariner in which the hitch, front axle beam and rear axle beam are pivotally moved.
Figure 3:
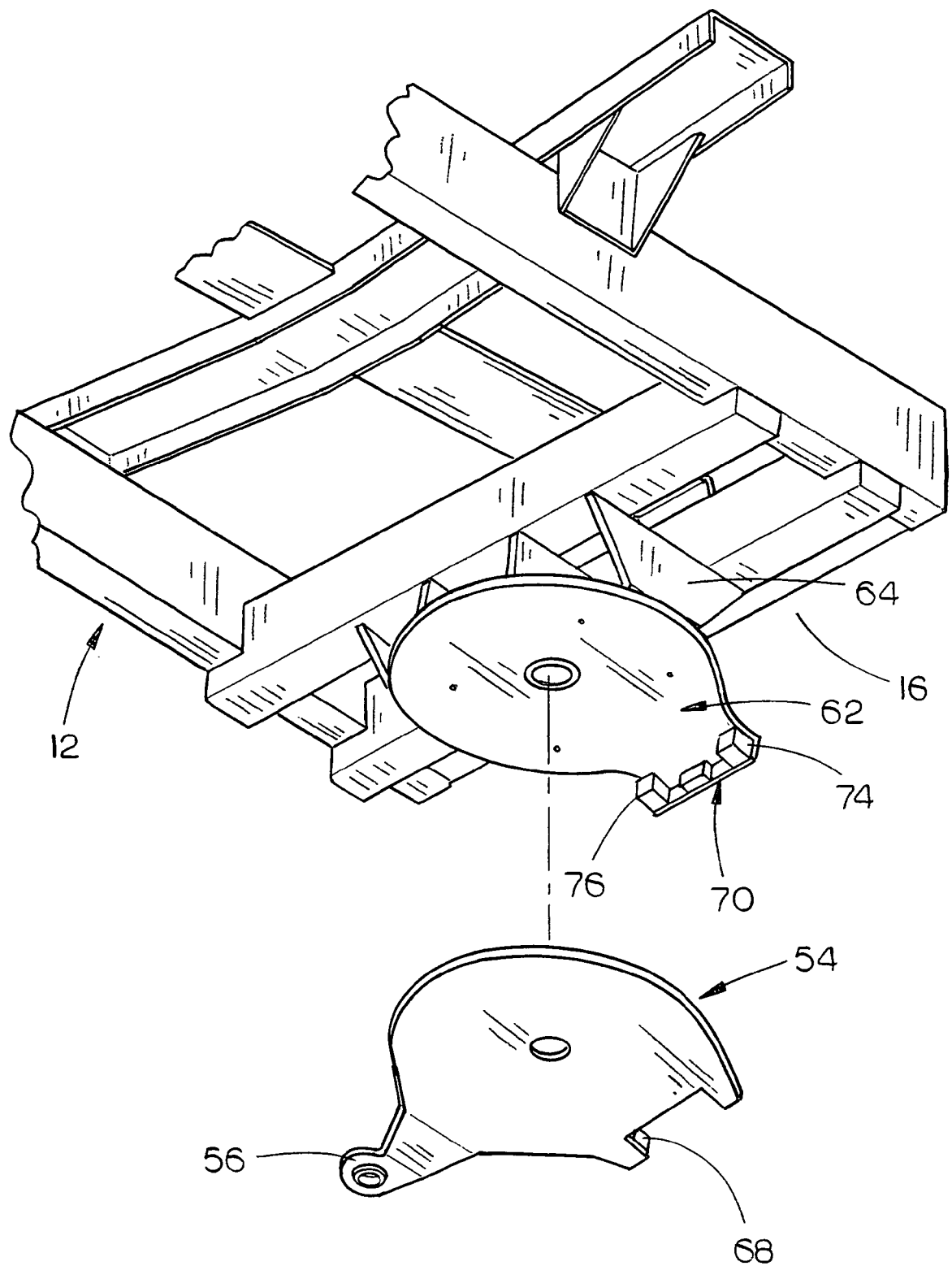
FIG. 3 is bottom perspective view of the rear end of the main frame and the upper plate secured thereto as well as the intermediate plate.
Figure 4:
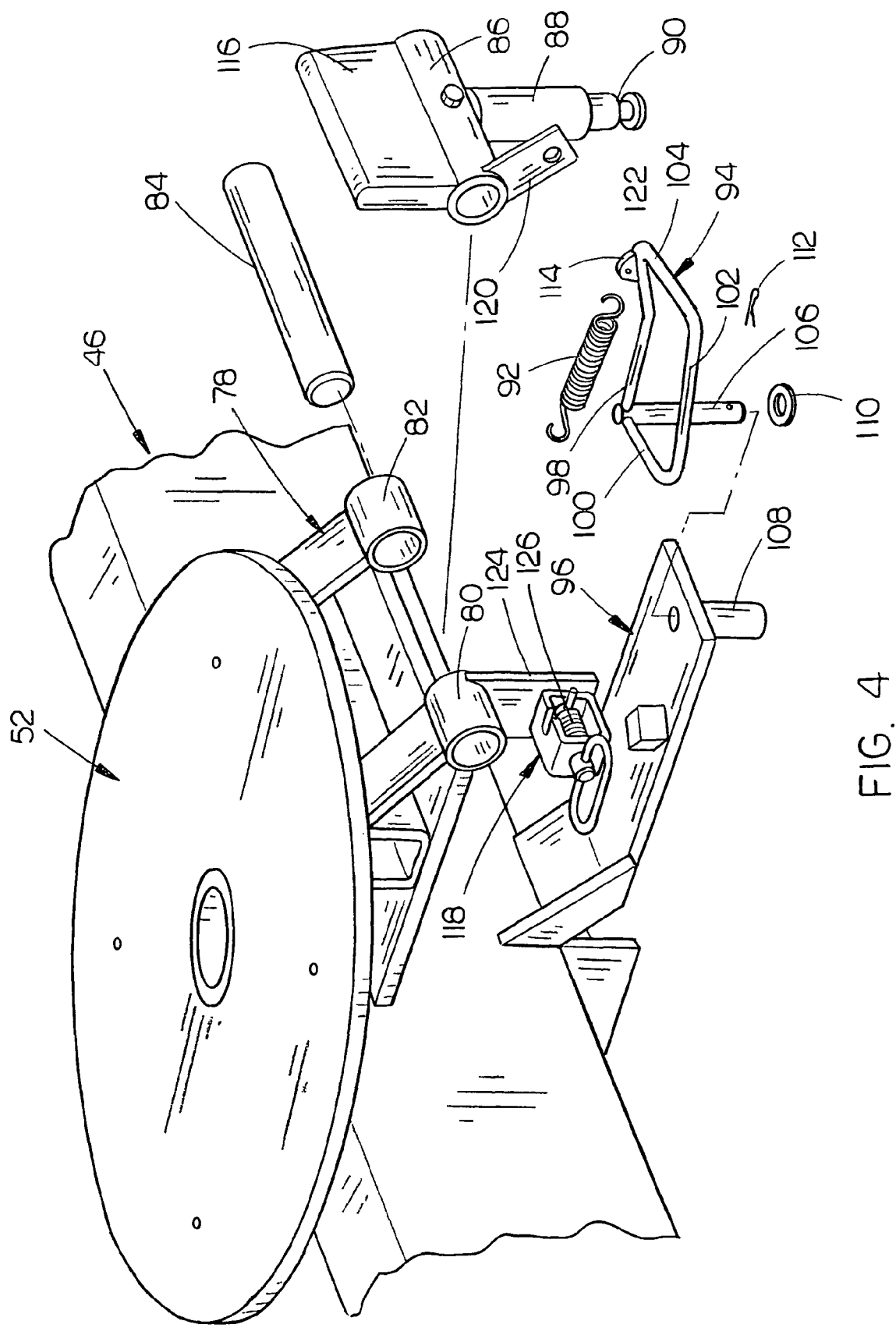
FIG. 4 is an exploded perspective view of the locking mechanism mounted on the rear axle beam.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer of this invention is referred to generally by the reference numeral 10. Trailer 10 includes a generally horizontally disposed frame 12 having a forward end 14, a rearward end 16, a left side 18 as viewed from the rear, and a right side 20 as viewed from the rear. Trailer 10 includes a length adjustable front axle beam 22 having wheels 24 and 26 secured to the ends thereof. Hitch or tongue 28 has its rearward end pivotally secured, about a transverse horizontal axis, to framework 30 which is secured to front axle beam 22 and which extends forwardly therefrom. The numeral 32 refers to a yoke which is pivotally secured to front axle beam 22, about a horizontal axis, by a pivot pin 34 so that the ends of front axle beam 22, and the wheels secured thereto, may move upwardly and downwardly with respect to yoke 32 to compensate for irregular or uneven terrain. A horizontally disposed plate is secured to the upper end of yoke 32 by welding or the like.

The forward end of frame 12 has a horizontally disposed plate 38 welded to the underside thereof which is movably positioned on the plate on yoke 32. A vertically disposed pivot pin or king pin 40 pivotally connects the plate on yoke 32 and plate 38 to enable the front axle beam 22 to pivot with respect to the forward end of frame 12. The forward end of a tie rod 42 is pivotally secured, about a vertical axis, to front axle beam 22 at 44 and extends diagonally rearwardly therefrom.

The numeral 46 refers to a length adjustable rear axle beam having wheels 48 and 50 rotatably mounted on the ends thereof. A horizontally disposed lower plate 52 is welded to the top of rear axle beam 46 at the center thereof. A horizontally disposed intermediate plate 54 is rotatably positioned on plate 52 and has a bar or arm 56 extending laterally and upwardly therefrom. The rearward end of tie rod 42 is pivotally connected, about a vertical axis, to the outer end of bar 56 by bolt or pin 58. Pivot or king pin 60 extends vertically upwardly through rear axle beam 46 and extends upwardly through plates 52 and 54 and through the horizontally disposed upper plate 62 which is welded to the lower end of yoke 64.

The upper end of yoke 64 is secured to the rearward end of frame 12 by welding or the like. The rearward end of plate 54 has a pair of horizontally spaced-apart lugs 66 and 68 welded thereto which extend downwardly from the underside thereof. The rearward end of plate 62 has a generally U-shaped channel 70 having a base portion 72 and ends 74 and 76 which extend forwardly from base portion 72 to form a forwardly facing pocket.

Support 78 is welded to rear axle beam 46 and extends rearwardly therefrom. A pair of horizontally spaced-apart collars 80 and 82 are welded to the rearward end of support 78 and have a shaft 84 mounted therein in a fixed manner. Collar or sleeve 86 is rotatably mounted on shaft 84 between collars 80 and 82 and has a tubular member 88 welded thereto which extends transversely downwardly therefrom. A spring retainer pin 90 is positioned in tubular member 88 with its lower end protruding from the lower end of tubular member 88. One end of a spring 92 is connected to the lower end of pin 90.

The numeral 94 refers to a locking handle assembly which is pivotally or rotatably mounted on the rear end of a support 96 which is welded to rear axle beam and which extends rearwardly therefrom. Locking handle assembly 94 includes leg portions 98, 100, 102 and 104. Locking handle assembly 94 also includes a pivot pin 106 which extends downwardly therefrom at the juncture of leg portions 98 and 100 and which is pivotally received by tube 108, the upper end of which is welded to the rearward end of support 96. A washer 110 embraces the exposed lower end of pin 106 and is held in place by cotter key 112. A bracket 114 extends upwardly from the end of leg portion 98 and has the other end of spring 92 secured thereto.

A rectangular bar 116 is welded to sleeve 86 and extends therefrom. The length of bar 116 is such that it may be received in the pocket between the ends 74 and 76 of channel 70 and able to be received between lugs 66 and 68.

Figure 5:
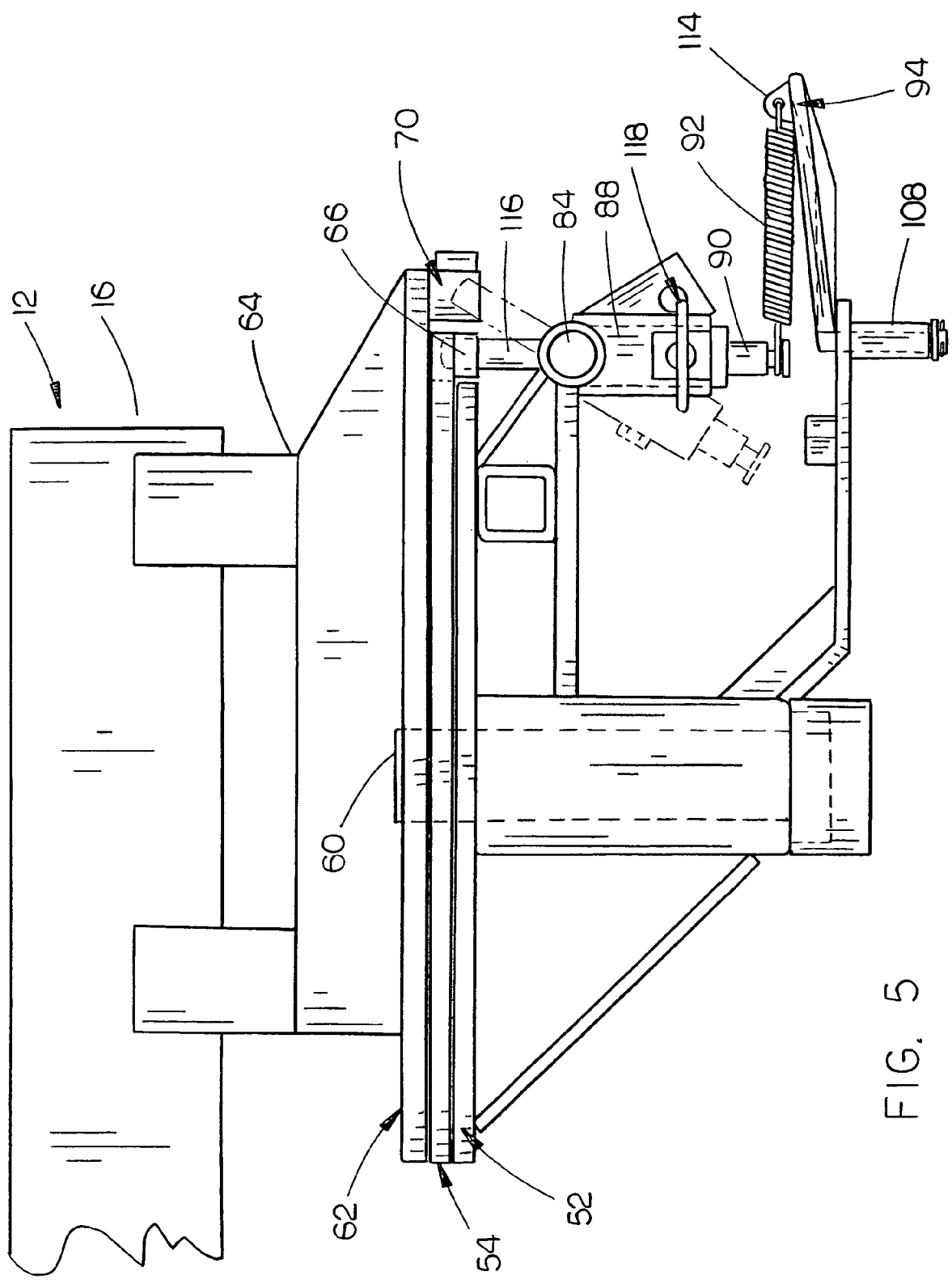
FIG. 5 is a side elevational view of the rear end of the trailer illustrating the locking mechanism.
Figure 6:
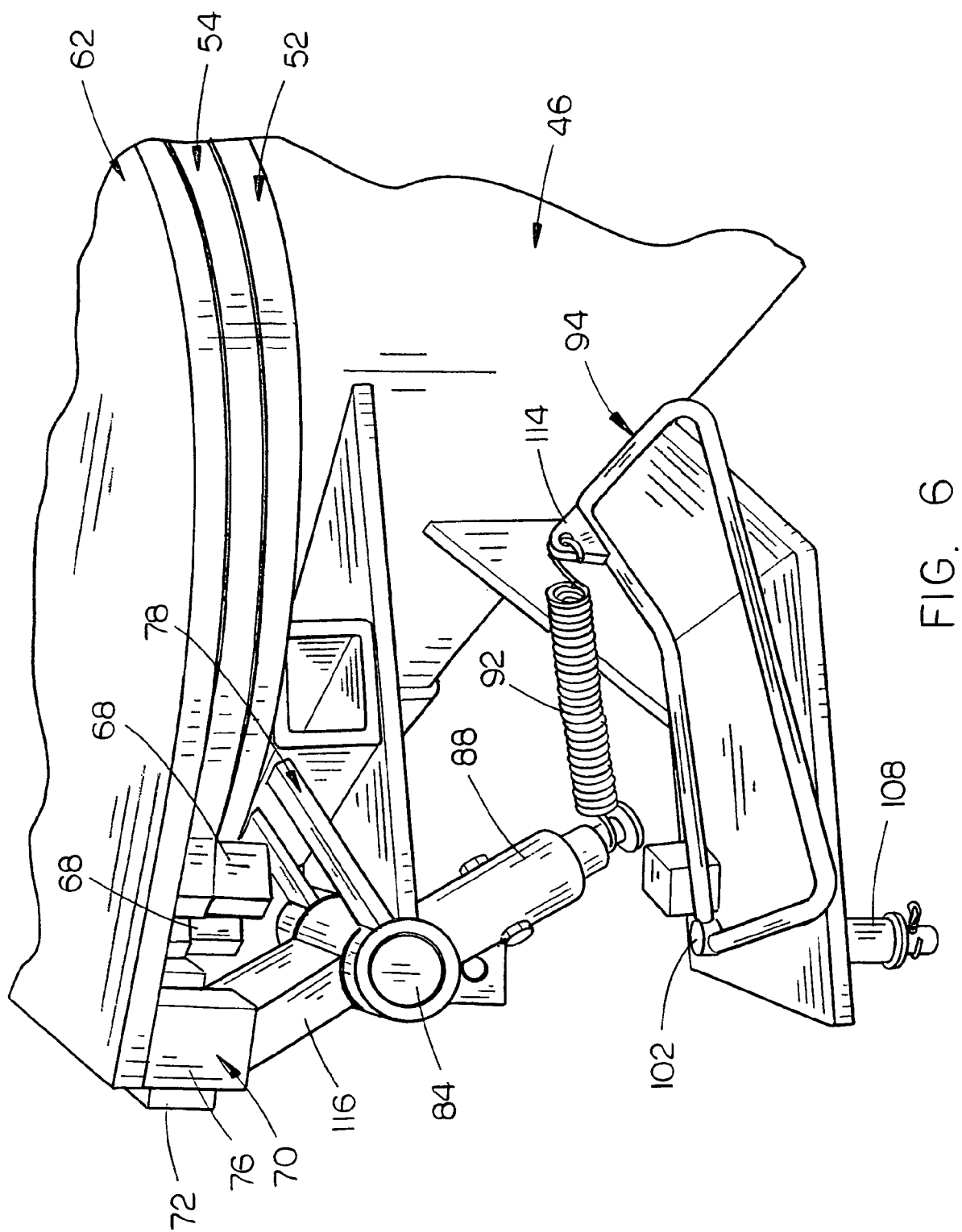
FIG. 6 is a perspective view illustrating the locking mechanism.
Figure 7:
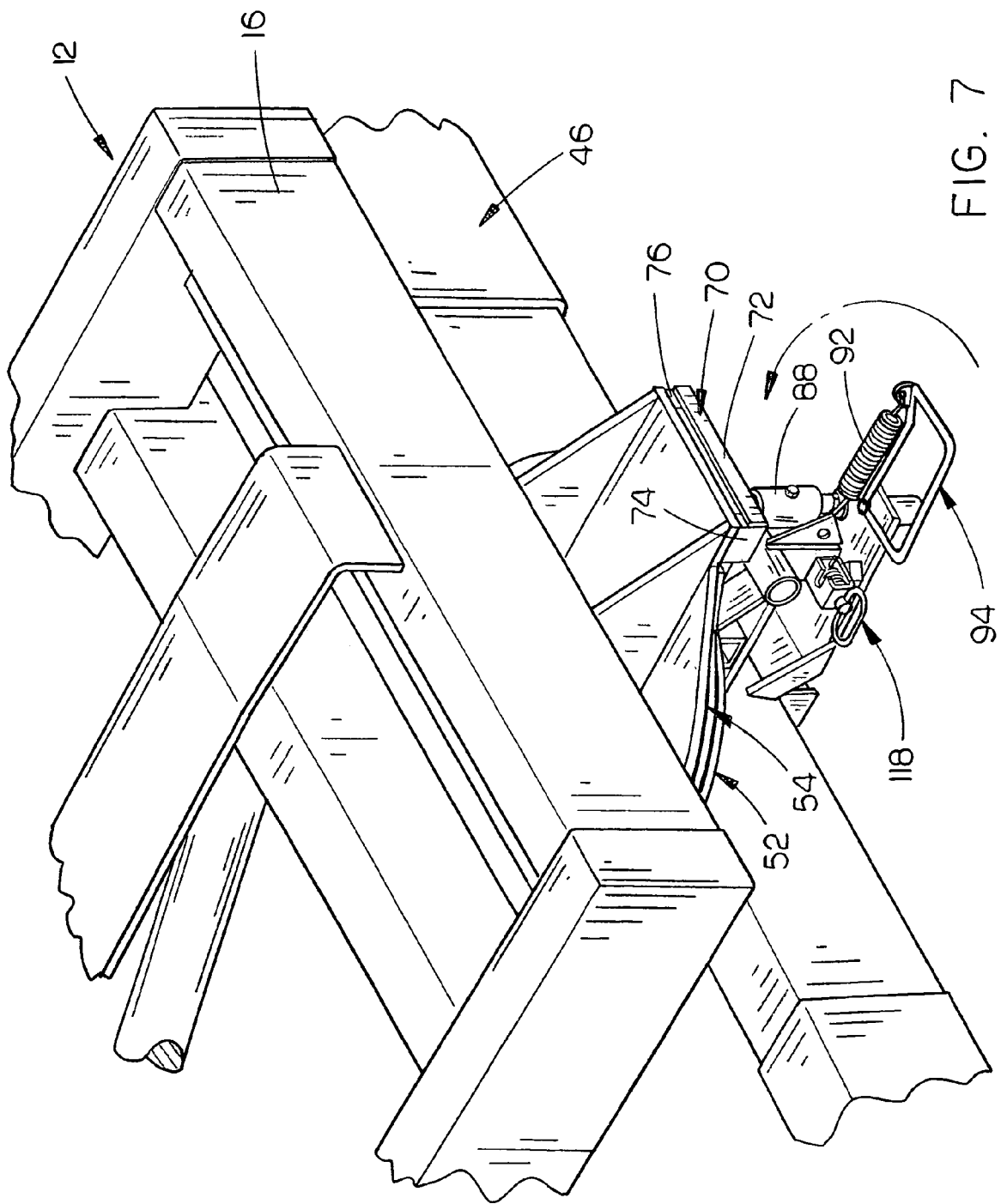
FIG. 7 is a rear perspective view illustrating the locking mechanism in a first position with the broken arrow illustrating the pivotal movement of the locking handle.

When the locking handle assembly is in its second position, the tension in spring 92 causes the sleeve to be rotated with respect to shaft 84 so that bar 116 is received within channel 70 so that yoke 64 is "locked" to rear axle beam 46 which prevents any pivotal movement of rear axle beam 46 with respect to frame 12 as indicated by broken lines in FIG. 5. Pivotal movement of front axle beam 22 with respect to frame 12 does not cause any pivotal movement of rear axle beam 46 since the rearward end of the tie rod 42, which is connected to plate 54, simply causes plate 54 to freely pivot with respect to rear axle beam 46.

When the locking handle assembly is in its first position, as illustrated in FIG. 5, the tension in spring 92 causes the sleeve 86 to rotate with respect to shaft 84 which causes bar 116 to be pivotally pulled or moved forwardly between the lugs 66 and 68 on plate 54 to unlock the bar 116 from channel 70 and to cause plate 62 to be locked to the plate 52. In this position, pivotal movement of front axle beam 22 with respect to frame 12 causes plate 52 to pivot or rotate due to its connection to the tie rod 42. Pivotal movement of plate 54 will cause rear axle beam 46 to pivot with respect to frame 12 in a direction opposite to the movement of front axle beam 22 due to the fact that plate 54 is locked to plate 52 which is fixedly secured to the rear axle beam.

Bar 116 will be selectively locked to plate 52 when the trailer is being used in the field. Bar 116 will be selectively locked to the stationary plate 62 when the trailer is being towed on a highway or the like so that it will trail properly.

A safety mechanism is preferably provided which is referred to generally by the reference numeral 118. Safety mechanism 118 includes a flat plate 120, one end of which is welded to sleeve 86. The outer end of plate 120 is provided with an opening 122 formed therein. Safety mechanism 118 also includes a flat plate 124, one end of which is welded to collar 80. A spring loaded plunger 126 is secured to the plate 124 and is adapted to be received in opening 122 in plate 120 when bar 116 is received within channel 70 to further ensure that rear axle beam 46 will not inadvertently pivotally move with respect to frame 12 when the trailer 10 is being towed on a highway or the like.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An all-wheel steer trailer, comprising:
a substantially horizontally disposed frame having a forward end, a rearward end, a left side and a right side;
a transversely extending front axle beam having first and second ends;
a first wheel rotatably secured to said first end of said front axle beam;
a second wheel rotatably secured to said second end of said front axle beam;
a hitch secured to said front axle beam which extends forwardly therefrom for connection to a towing vehicle;
said front axle beam being pivotally secured, about a vertical axis, to said frame means and the forward end thereof;
a transversely extending rear axle beam, having first and second ends, pivotally secured about a vertical axis to said frame at the rearward end thereof;
a third wheel rotatably secured to said first end of said rear axle beam;
a fourth wheel rotatably secured to said second end of said rear axle beam;
a lower horizontally disposed plate secured to said rear axle beam at the pivotal connection of said rear axle beam to said frame;
an upper horizontally disposed plate secured to said frame above said lower plate;
an intermediate horizontally disposed plate positioned between said lower and upper plates;
an elongated tie rod having forward and rearward ends;
said forward end of said tie rod being pivotally secured, about a vertical axis, to said front axle beam inwardly of said first end thereof;
said rearward end of said tie rod being pivotally secured, about a vertical axis, to said intermediate plate;
a vertically disposed king pin extending through said lower, intermediate and upper plates to pivotally secure said rear axle beam to said frame;
and a locking assembly mounted on said rear axle beam which is selectively movable between first and second portions;
said locking assembly, when in its said first position, interconnecting said rear axle beam to said intermediate plate whereby pivotal movement of said front axle beam in a first direction with respect to said frame will cause said rear axle beam to pivotally move with respect to said frame in a direction opposite to said first direction;
said locking assembly when in its said second position, being disengaged from its connection to said intermediate plate and being interconnected with said upper plate to prevent pivotal movement of said rear axle beam with respect to said frame when said front axle beam is pivoted with respect to said frame;
said intermediate plate having a rearward end;
a pair of horizontally spaced-apart lugs mounted on said rearward end of said intermediate plate;
said locking assembly has a rearward end and wherein a pair of horizontally spaced-apart lugs are mounted on said rearward end of said intermediate plate, said locking assembly including a pivotal bar;
said pivotal bar of said locking assembly engaging said lugs, when said locking assembly is in its said first position to interconnect said rear axle beam to said intermediate plate.

2. The trailer of claim 1 wherein said upper plate has a rearward end and wherein said rearward end of said upper plate has a forwardly facing pocket provided thereon, said pivotal bar of said locking assembly being received by said forwardly facing pocket, when said locking assembly is in its said second position, to interconnect said upper plate to said rear axle beam.

3. The trailer of claim 2 wherein a spring means is operatively connected to said pivotal bar to yieldable maintain said pivotal bar in said pocket and to yieldably maintain said pivotal bar in engagement with said lugs.

4. The trailer of claim 3 wherein said locking assembly includes a pivotal handle which is operatively connected to said pivotal bar by way of said spring means.

5. The trailer of claim 1 wherein said intermediate plate has a laterally extending arm extending therefrom to which said rearward end of said tie rod is pivotally connected.

6. The trailer of claim 1 wherein said front and rear axle beams are length adjustable.

7. The trailer of claim 1 further including a safety mechanism which locks said locking assembly in its said second position.

8. An all-wheel steer trailer, comprising:
a frame having a forward end, a rearward end, a left side and a right side;
a transversely extending front axle beam having first and second ends pivotally secured about a vertical axis to said frame at the forward end thereof;
a first wheel rotatably secured to said first end of said front axle beam;
a second wheel rotatably secured to said second end of said front axle beam;
a hitch secured to said front axle beam which extends forwardly therefrom for connection to a towing vehicle;
a transversely extending rear axle beam, having first and second ends, pivotally secured about a vertical axis to said frame at the rearward end thereof;
a third wheel rotatably secured to said first end of said rear axle beam;
a fourth wheel rotatably secured to said second end of said rear axle beam;
an elongated tie rod having a forward end and a rearward end;
said forward end of said tie rod being pivotally secured, about a vertical axis, to said front axle beam inwardly of said first end thereof;
a lower horizontally disposed plate fixedly secured to said rear axle beam at the pivotal connection of said rear axle beam to said frame;
an upper horizontally disposed plate fixedly secured to said frame above said lower plate;
an intermediate horizontally disposed plate positioned between said lower and upper plates;
each of said intermediate plate and said lower plate being rotatably movable with respect to said upper plate;
said rearward end of said tie rod being pivotally secured, about a vertical axis, to said intermediate plate whereby pivotal movement of said front axle beam in a first direction with respect to said frame will cause said intermediate plate to rotate in a first direction and whereby pivotal movement of said front axle in a direction opposite to said first direction will cause said intermediate plate to rotate in a direction opposite to said first direction;
a locking device secured to said frame which is movable between first and second positions;
said locking device, when in said first position, locking said intermediate plate to said lower plate whereby pivotal movement of said front axle beam in a first direction with respect to said frame will cause said rear axle beam to pivotally move with respect to said frame in a direction opposite to said first direction and whereby pivotal movement of said front axle beam in a second direction with respect to said frame will cause said rear axle beam to pivotally move with respect to said frame in a direction opposite to said second direction;

said locking device, when in said second position, locking said lower plate and said upper plate together and unlocking said intermediate plate from said lower plate whereby said tie rod is rendered inoperative, without physically disconnecting said tie rod from said intermediate plate or from said front axle beam, so that pivotal movement of said front axle beam with respect to said frame will not cause pivotal movement of said rear axle beam with respect to said frame.

\* \* \* \* \*